(12) United States Patent
Schwab

(10) Patent No.: US 6,820,404 B1
(45) Date of Patent: Nov. 23, 2004

(54) CROP LIFTER

(75) Inventor: Jerome A. Schwab, 1466 Griffin Dr., Davison, MI (US) 48423

(73) Assignee: Jerome A. Schwab, Davison, MI (US)

( * ) Notice: Subject to any disclaimer, the term of this patent is extended or adjusted under 35 U.S.C. 154(b) by 0 days.

(21) Appl. No.: 10/383,269

(22) Filed: Mar. 7, 2003

Related U.S. Application Data

(60) Provisional application No. 60/362,433, filed on Mar. 7, 2002.

(51) Int. Cl.$^7$ .............................................. A01D 45/02
(52) U.S. Cl. .......................................................... 56/64
(58) Field of Search ................................. 56/64, 62, 79, 56/94, 103, 113, 504

(56) References Cited

U.S. PATENT DOCUMENTS

| | | | | |
|---|---|---|---|---|
| 3,826,315 A | * | 7/1974 | Blair ........................... | 172/514 |
| 4,141,302 A | * | 2/1979 | Morrison et al. ............. | 111/52 |
| 4,452,315 A | * | 6/1984 | Swanson ..................... | 172/29 |
| 4,489,787 A | * | 12/1984 | Gary ............................ | 172/1 |
| 4,779,684 A | * | 10/1988 | Schultz ........................ | 171/62 |
| 4,781,129 A | * | 11/1988 | Swanson et al. ............ | 111/167 |
| 5,237,804 A | * | 8/1993 | Bertling ........................ | 56/60 |
| 5,285,854 A | * | 2/1994 | Thacker et al. ............. | 172/176 |
| 6,298,643 B1 | * | 10/2001 | Wuebbels et al. ............. | 56/60 |
| 6,430,907 B2 | * | 8/2002 | Wolters et al. ................ | 56/64 |

\* cited by examiner

*Primary Examiner*—Árpád Fábián Kovács
(74) *Attorney, Agent, or Firm*—Reising, Ethington, Barnes, Kisselle & Learman, P.C.

(57) ABSTRACT

The crop lifters include a pair of rotatable disks with rims that converge towards each other below and to the rear of their centers and that diverge from each other above and forward of their centers. As the disks are carried forward by a harvester, each pair of disks gather plant material, grasp the plant material, lift the plant material and then release the plant material above an elevating conveyor. The disks remain above the surface of the ground and are rotated by crop material as the harvester moves forward or are driven by motors. Flexible disks have rims that are forced to converge by slide bearings. Semi-ridged disks are mounted on axes that extend toward each other, upward, and forward from each disk center. A plurality of pairs of disks can be carried by one harvester. A knife severs plants from their roots forward of the conveyor.

14 Claims, 6 Drawing Sheets

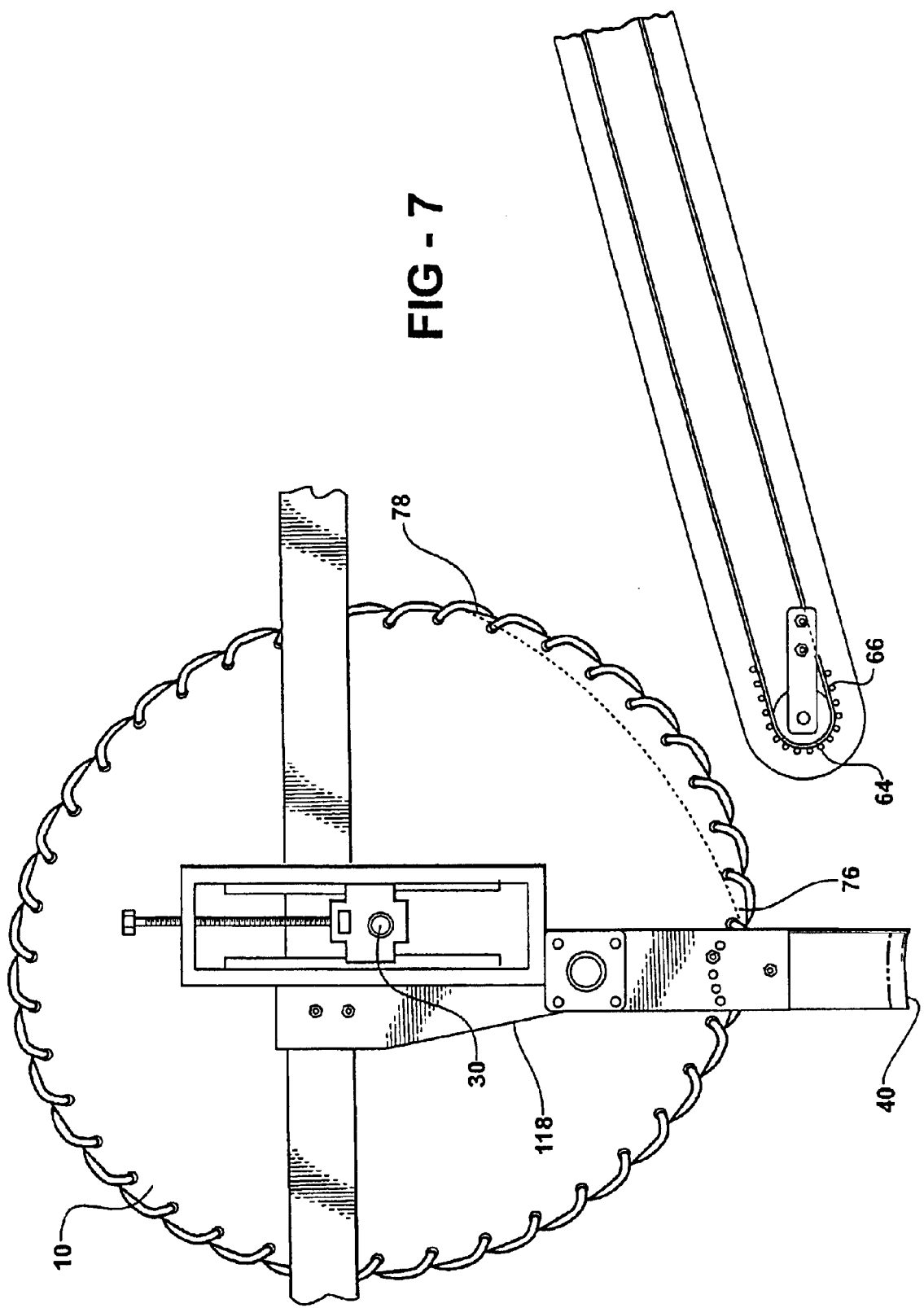

CROP LIFTER

The disclosure incorporates the crop lifter and methods disclosed in provisional patent application No. 60/362,433, filed Mar. 7, 2002, whose priority is claimed for this application.

TECHNICAL FIELD

The crop lifter is employed on a vegetable harvester to lift plant material, that has been severed from the ground, and deposit the plant material on an elevating conveyor.

BACKGROUND OF THE INVENTION

Vegetables which grow on vines and bushes such as cucumbers, zucchini and squash have heavy green foliage and heavy dense fruit. The fruit can be harvested by hand or by mechanical harvesters. When the fruit is harvested by hand, the harvest involves manually removing fruit as the fruit reaches the desired size and ripeness. For some crops, fruit is removed from a given plant a number of times. The period of time between the first removal and the last removal can vary from several days to a number of weeks. The fruit of a few crops can be harvested over most of an entire growing season.

Fruit picked by hand is generally relatively expensive. Some vegetables are highly desired and customers will pay a premium price. Other vegetables will not command a premium price. For vegetables that will not be purchased at a premium price, people can grow them in their gardens or they can be harvested by mechanical harvesters. Cucumbers, for example, are generally harvested by mechanical harvesters. These harvesters are whole crop harvesters that remove the entire crop in one pass through the field. Such harvesters remove some fruit that is too mature or too large as well as fruit that is immature and too small. The fruit that is too mature as well as the fruit that is immature is discarded. Mechanical harvesters reduce the cost of harvesting by machine over the cost of hand picking by a sufficient amount to more than offset the losses due to discarding fruit that is too mature and fruit that is immature.

Grain crops such as barley, flax, dry beans, and wheat are frequently severed from their roots and left on the ground to dry for a few days. After these crops dry, they are picked up with a pick-up attachment on a grain harvester, thrashed and cleaned. The stocks, leaves and foliage are dead, dry and lightweight. The seeds are also dry. Due to the dryness and the relatively light weight, such crop material is easy to lift off the ground and convey into a harvesting machine.

Vegetable crops are generally harvested before the plant or the fruit lose an appreciable portion of their water content. Cucumbers for example that have remained in the field and lost a significant portion of their total water content are no longer suitable for human consumption. It is therefore necessary to gather such fruit and transport it to a processing facility as soon as possible after the plant has been severed from the ground.

Vegetable harvesters, that remove the whole crop from the ground, often have blades that separate plants and fruit from their root systems. A conveyor directly behind the blade or blades, that lifts the plant material from the ground, elevates the plant material and delivers the plant material to a cleaning station and to a fruit separation station. The heavy wet crop material and fruit tends to be pushed forward by the conveyor before it is lifted up onto the conveyor. As a result some fruit is damaged and some fruit is lost. The quantity of dirt, rocks and old crop residue conveyed into the harvester is increased.

U.S. Pat. No. 4,965,993 discloses a vine gripping convey that clamps some leaves and vines between pinch bars, elevates and carries the crop material on the upper run of a main conveyor. The pinch bars lift some crop material and drag other crop material up onto the main conveyor. This has reduced losses and permitted an increase in the ground speed of the harvester thereby increasing harvester capacity. The pinch bars must move down below the tops of the vegetation to engage and grasp leaves and vines. As pinch bars move down into the vegetation they tend to force some leaves, stalks and vines downward where they cannot be clamped between two bars. In some crop conditions the vines remain relatively close to the ground and most of the leaves remain relatively close to the ground. In these conditions, the pinch bars cannot engage large quantities of crop material and provide only minimal assistance in conveying crop material onto the main conveyor.

SUMMARY OF THE INVENTION

The crop lifters include a disk on each side of a row of plants. Each of these disks rotate about an axis that extends from positions to the side of a plant row inward toward the plant row, forward in the direction of movement and slightly upward from horizontal. Two adjacent disks on opposite sides of a row of plants form a crop lifter. The disks of a crop lifter diverge to the front and upward from their centers. The radially outer portions of each pair of the disks make contact with each other below their hubs and to the rear of their hubs. In this position the two adjacent hubs move crop material inward toward the center of a row, clamps crop material between the two adjacent disks and lift the crop material. The two disks move out of contact with each other at or slightly below the height of their hubs and to the rear of their hubs. As the disks separate, vegetation that was lifted is dropped onto the upper portion of the forward end of the main conveyor.

The pairs of adjacent disks that rotate about axes that intersect at a point midway between the two disks, forward of the disk centers and above the disks axes can be driven by the crop material and forward movement of the harvester. The disk could also be positively driven if desired.

The crop lifters for a row of plants can also include two disks that are spaced apart and mounted on a horizontal transverse shaft. The horizontal transverse shaft is driven. Both of the disks are made from flexible material. Closure arms force the rim portions of the flexible disks together behind and below the axis of the driven shaft. Contact between the rims occurs for up to 35° about the axis of the driven shaft.

BRIEF DESCRIPTION OF THE DRAWINGS

The presently preferred embodiment of the invention is disclosed in the following description and in the accompanying drawings, wherein:

FIG. 7 is a schematic side elevational view of the crop lifting disks, the knife blade and the primary conveyor lower end.

DETAILED DESCRIPTION OF THE PREFERRED EMBODIMENT

Figure 1:
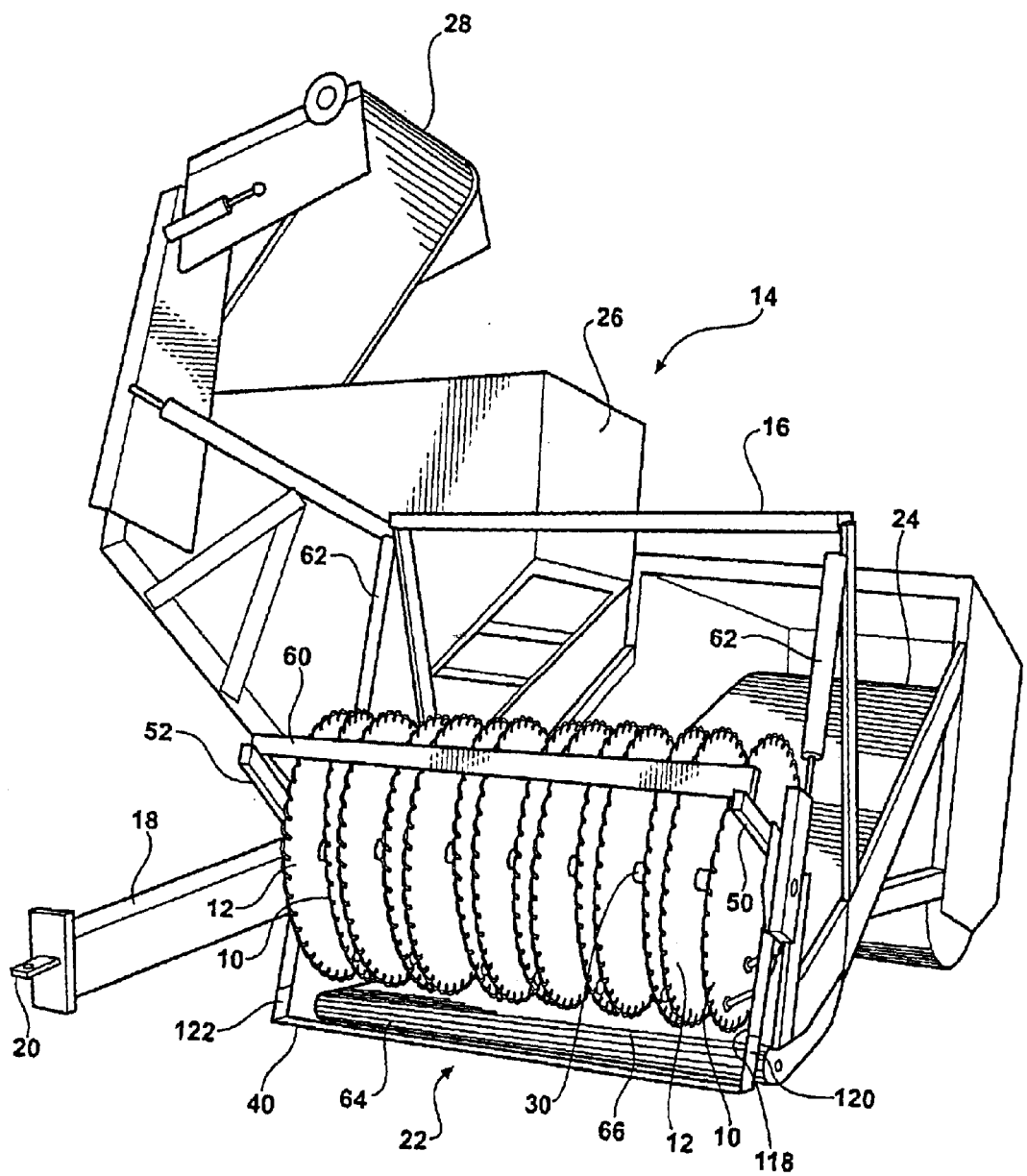
FIG. 1 is a perspective view of a vegetable harvester with crop lifting disks mounted on a common shaft.

The crop lifter disks 10 and 12, as shown in FIG. 1, are part of a cucumber harvester 14. The harvester 14 has a frame 16 supported by wheels (not shown). A tongue 18 of the frame 16 includes a hitch member 20 for attaching the crop harvester 14 to the drawbar of a tractor. The harvester 14 carries a harvesting assembly 22 for separating plant material from plant roots, cleaning conveyors 24 for separating soil and rocks from the plant material, processing assemblies (not shown) for separating fruit such as cucumbers from the vines, and a fruit storage bin 26. A discharge conveyor 28 is provided for discharging fruit from the storage bin 26.

Figure 2:
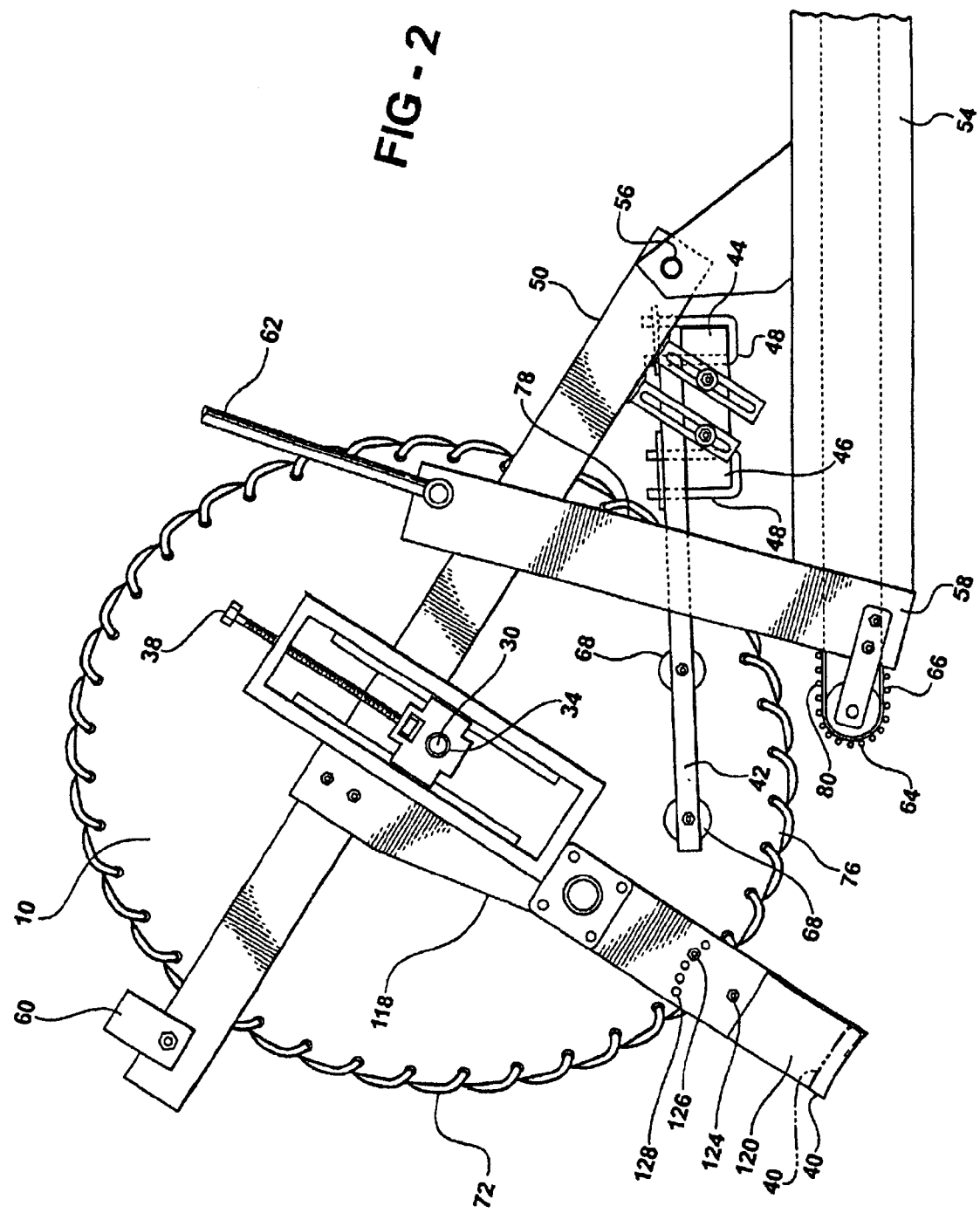
FIG. 2 is an enlarged side elevational view of crop lifting disks of FIG. 1, a cutter blade and a primary conveyor with parts broken away.
Figure 3:
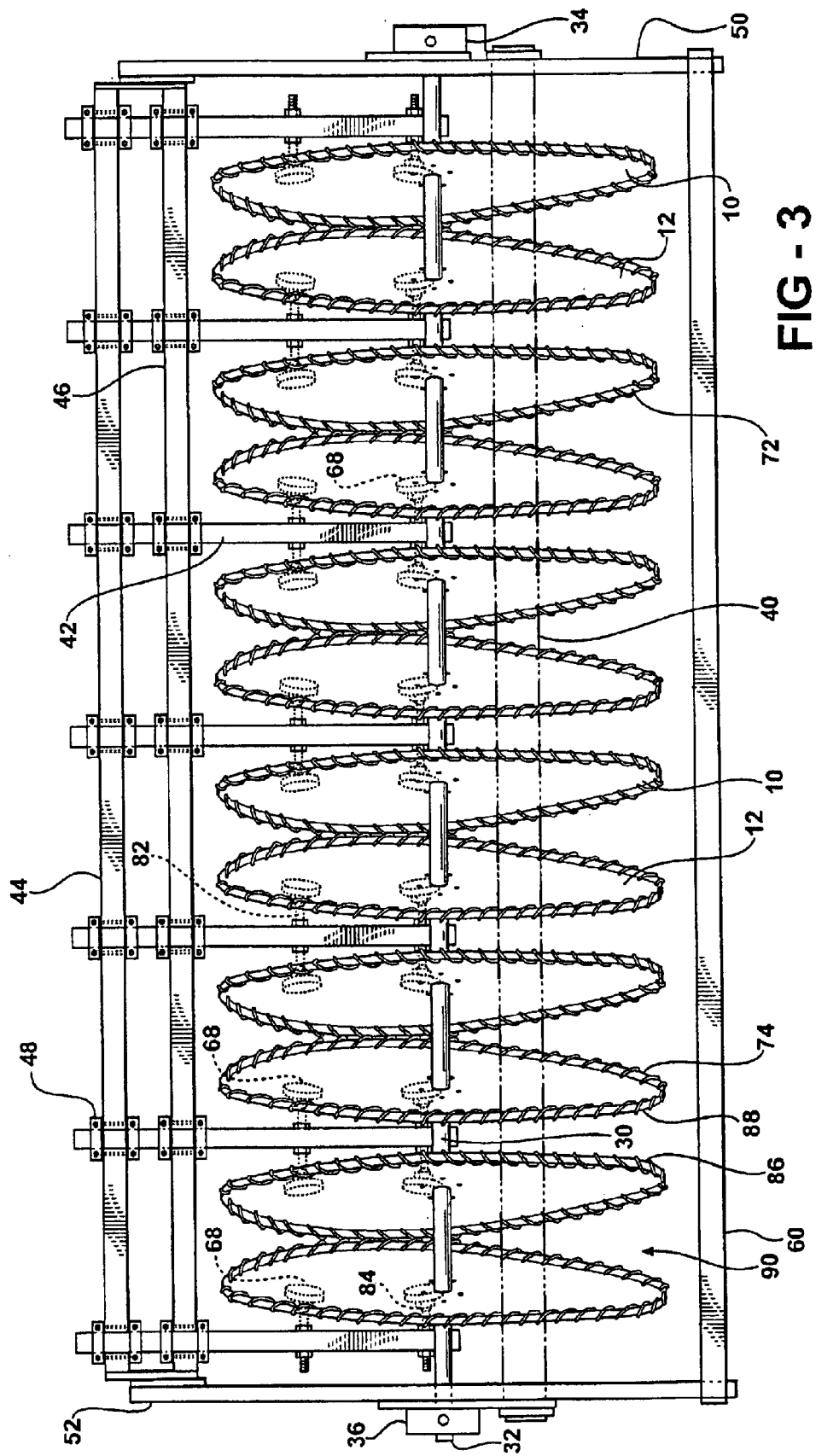
FIG. 3 is a top plan view of the crop lifting disks mounted on a common shaft.

The crop lifter disks 10 and 12, as shown in FIGS. 1–3 are mounted on a transverse horizontal shaft 30. The shaft 30 is driven by a hydraulic motor 32. The shaft 30 is journalled on bearings 34 and 36 that are supported by the harvester 14 and are vertically adjustable by screws 38.

A cutter blade 40 is moved forward under the ground and severs plants from their roots. As shown in FIG. 7, the cutting edge of the blade 40 is slightly forward of the shaft 30. The position of the blade 40 relative to the shaft 30 is adjustable by adjusting the screws 38 and the bearings 34 and 36 to raise or lower the shaft 30.

Disk spreaders 42 are clamped to crossbeams 44 and 46 by U-bolts 48. The crossbeams 44 and 46 are adjustably connected to fore and aft support beams 50 and 52. The support beams 50 and 52 are pivotally connected to a conveyor frame 54 by pins 56 and uprights 58. The uprights 58 are connected to the support beams 50 and 52 as well as to the conveyor frame 54. The conveyor frame 54 is pivotally attached to the harvester frame 16. A front beam 60 is secured to the forward ends of the support beams 50 and 52. Hydraulic cylinders 62 are connected to the uprights 58 and to the frame 16. The cylinders 62 control the height of the forward conveyor end 64 of the primary conveyor 66 and the blade 40.

Slide bearings 68 on the lower ends of the spreaders 42 engage the back sides of the flexible crop lifter disks 10 and 12 and force the peripheries 72 and 74 toward clamping engagement with each other. The disks 10 and 12 first engage each other or pinch foliage at a point 76. The disks 10 and 12 separate from each other at a point 78 and drop the foliage and fruit connected to the foliage onto an upper run 80 of the primary conveyor 66. The point 78 is about 35° from the point 76 about the axis of the shaft 30. The rear ends of the spreader arms 42 are adjustably attached to the crossbeams 44 and 46 to permit adjustment of row spacing. The positions of the slide bearings 68, the first engagement at 76 and the separation at point 78 are adjustable by threaded support members 82 and their location along the length of the spreaders 42. Slide bearings 68 are mounted on balls 84 that permit the bearings to pivot and maintain a maximum contact area on the disks 10 and 12.

Deflection of the peripheries 72 and 74 of the disks 10 and 12, by the spreaders 42 and slide bearings 68, into engagement between points 76 and 78 tends to deflect the peripheries away from each other on the opposite side of the shaft 30. When the rows of plants that are being harvested are close together, the outer periphery 72 of one disk 10 may contact the outer periphery 74 of a disk 12 on an adjacent row unit crop lifter 90. Each contact will occur generally above the shaft 30 and generally forward of the shaft. However, if two adjacent crop lifter row units 50 are close together, the contact between the outer edges 86 and 88 may extend more than 35° about the shaft 30.

Figure 4:
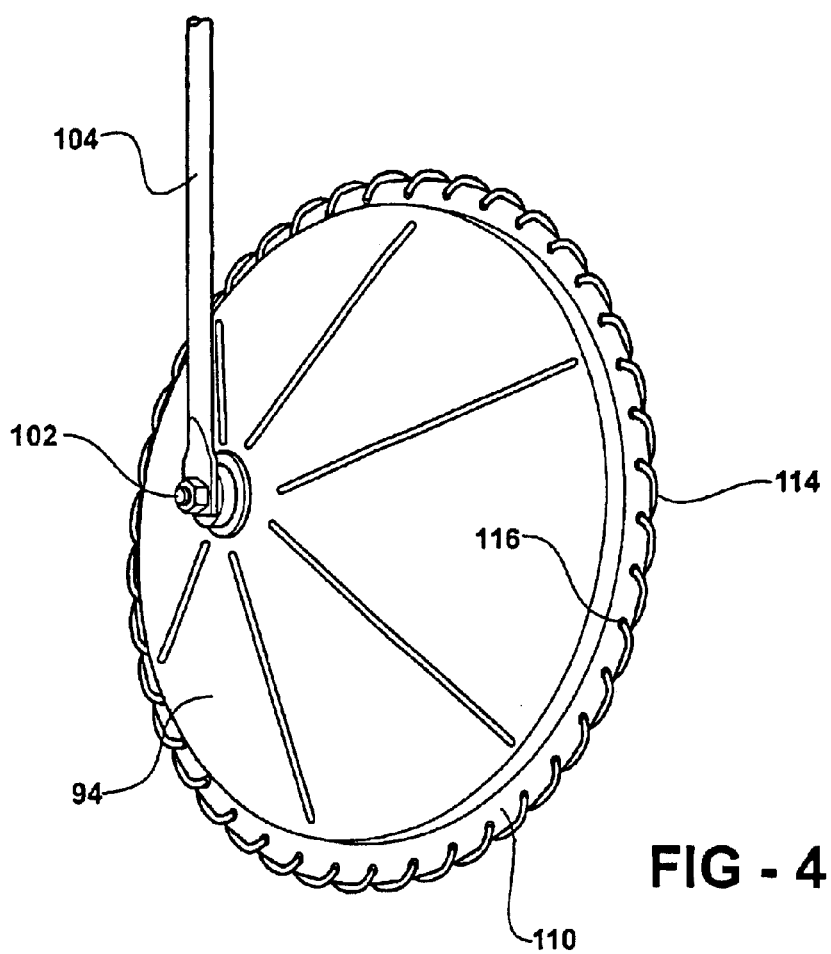
FIG. 4 is a perspective view of a single crop lifting disk on an independent spindle.
Figure 6:
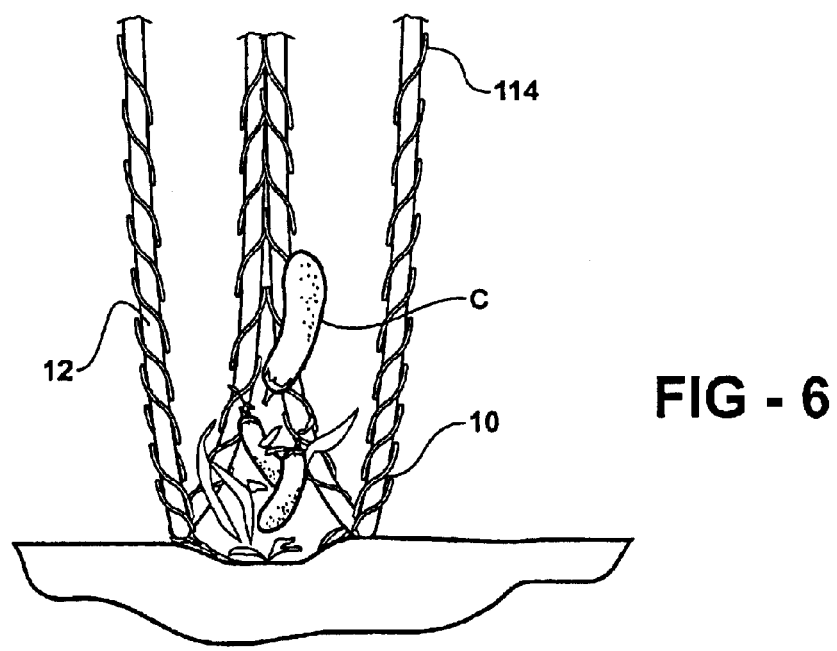
FIG. 6 is an enlarged elevational view of crop lifting disks grasping plant material with parts broken away.
Figure 5:
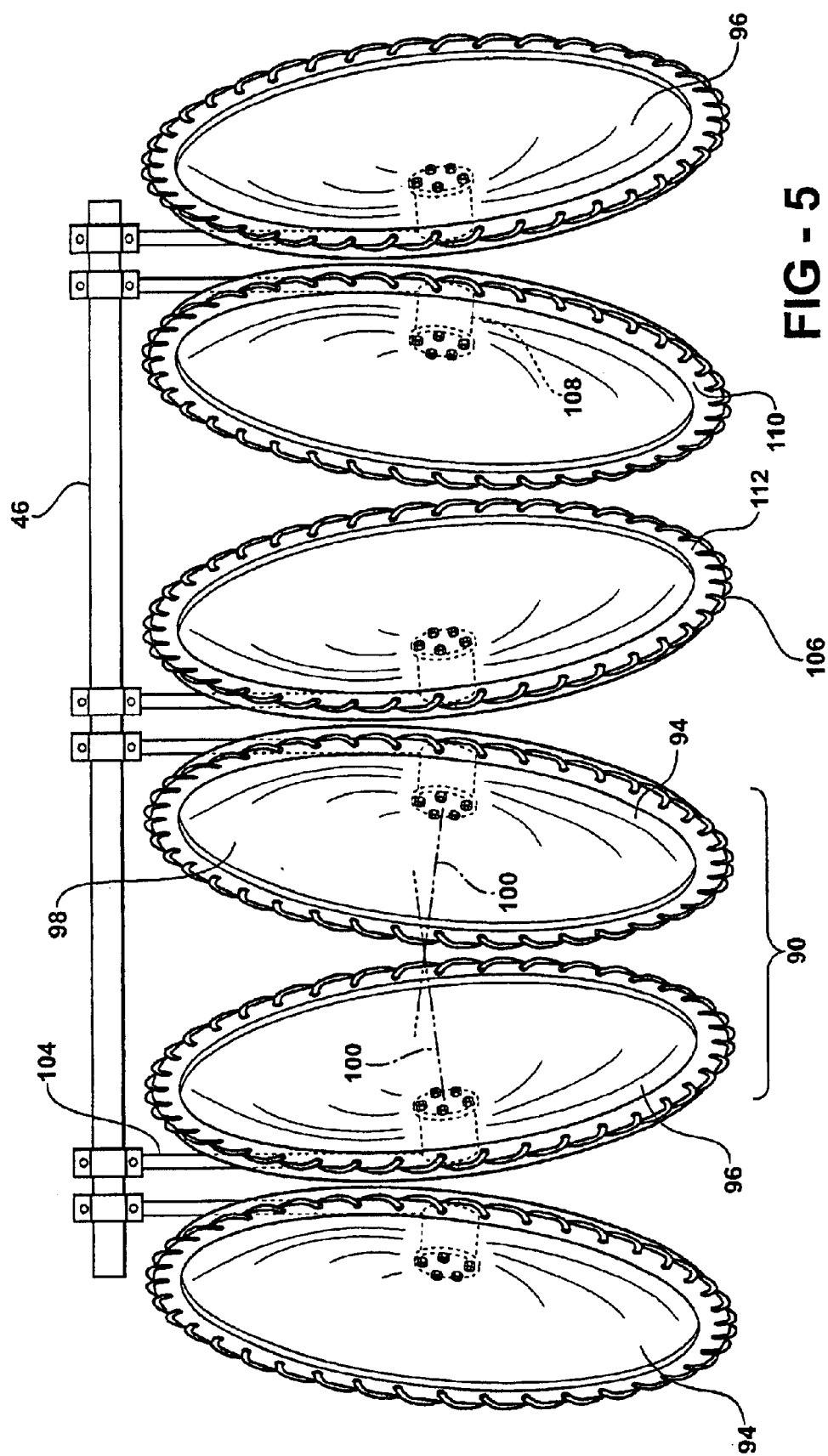
FIG. 5 is a front elevational view of crop lifting disks for two plant rows mounted on independent spindles.

Row units 90 shown in FIGS. 4 and 5 have a disk 94 and a disk 96. Each disk 94 and 96 has a concave side 98 that faces toward the other disk in a row unit 90. The axis 100 of each disk 94 and 96 is formed by a bolt 102 that clamps a disk to a support arm 104 which is fixed to the crossbeams 44 and 46 of the harvester 14. The axis of rotation 100 of each disk 94 and 96 extends upward, forward and inward from the support arm 104 and toward the other disk of a row unit 90. If the support arms 104 are not sprung out of shape, the axis of rotation 100 of the disks 94 and 96 of a row unit 90 will intersect each other at the vertical center of the row unit. The intersection will also be forward and above the locations in which each axis of rotation 100 passes through a support arm 104.

The disks 94 and 96 of a row unit 90 are rotated about their intersecting axes 100 by the engaged vegetation C and forward movement of the harvester 14. The disks 94 and 96 move leaves and some vines toward the center of a row unit 90 and then clamp the vines between the two disks as the vines and to leaves enter the area where the disks are close to each other. Continued rotation of the disks 94 and 96 lifts the vines and the attached fruit. In the area where the edges 106 of the disks 94 and 96 separate from each other, the clamping forces are released and the vines and foliage drop onto a harvester conveyor like the conveyor 66 shown in FIG. 3.

The disks 94 and 96 could be rotated by hydraulic motors 108 if desired. There would most likely be a separate motor 108 for each disk 94 and 96.

The front end of the conveyor 66 passes along the surface of a field and attempts to pick up fruit that is not lifted by the crop lifters 10 and 12 or 94 and 96. The action of lifting and dragging vines and fruit up the forward end 64 of the primary conveyor 66, as the disks 10 and 12 do or the disks 94 and 96 do, tends to carry some fruit onto the conveyor that might otherwise be lost.

The disks 10 and 12 are substantially flat and are somewhat flexible. The disks 94 and 96 with concave sides 98 are also flexible. However, the disks 94 and 96 with a concave side 98 are less flexible than the substantially flat disks 10 and 12. The concave disks 94 and 96 will generally engage each other between points 76 and 78 as shown in FIG. 7. The concave disks 94 and 96 have sufficient flexibility to accommodate such contact. However, the crop material to be lifted may hold the disks 10 and 12 as well as the disks 94 and 96 out of contact with each other. If the crop material to be lifted is thick and dense, it may be desirable to space the disks from each other slightly as shown in FIG. 5.

The disks 10 and 12 have peripheries 72 and 74. The disks 94 and 96 have peripheral rims 110 and 112. Small diameter flexible tubing 114 is threaded through apertures 116 and across the periphery of the disks 10, 12, 94 and 96 as shown in the drawing. The tubing 114 tends to grasp crop material C and limit movement of the disks 10, 12, 94 and 96 relative to the crop material.

The cutter blade 40 is attached to the bottom of arms 118 attached to the fore and aft support beams 50 and 52. The blade 40 has upturned ends 120 and 122 which are pivotally attached to the arms 118 by bolts 124. A second bolt 126 passes through a bore 128 through one of a plurality of bores 128 through each of the arms 118 and a bore through one of the upturned ends 120 and 122.

During operation of the harvester 14, the cylinders 62 lower the blade 40 into the ground so that it moves under the surface, severs the roots from the rest of the plants and leaves the fruit such as cucumbers on top of the soil. In most conditions, the blade 40 is about two inches below the surface. If the soil top surface is flat the depth of the blade 40 can be reduced. The forward conveyor end 64 of the primary conveyor 66 is just above the surface of the ground. In practice the forward end of the primary conveyor 66 is in contact with the ground at least part of the time. The disks 10 and 12 as well as the disks 94 and 96 are above the ground and above fruit such as cucumbers that might be on the ground. The disks 10 and 12 are driven at a speed which is about the same as ground speed of the harvester 14. At this speed, the disks 10 and 12 gently gather foliage and some vines, grip the crop material, raise the crop material and attached fruit and deposit the foliage and vines and the attached fruit on the primary conveyor 66.

The disks 94 and 96, when driven by hydraulic motors 108 function the same as the disks 10 and 12. However, due to reduced disk flexing, the disks 94 and 96 have a longer useful life than the disks 10 and 12.

The disks 94 and 96 gather and grasp foliage. As the harvester 14 moves forward, the stationary crop material clamped between the disks 94 and 96 causes the disks to rotate, lift foliage and fruit and then release the raised foliage and fruit on top of the upper run 80 of the primary conveyor 66. This lifting of fruit with the foliage reduces or eliminates the bunching of fruit and foliage in front of the conveyor 38 and reduces separation of the fruit from the vines and stems thereby reducing fruit loss and fruit damage. Reducing the buildup of material in front of the primary conveyor 66 also reduces the forces on the conveyor thereby increasing the life of the conveyor. The quantity of dirt and stones carried onto the conveyor 66 is also reduced.

The disclosed embodiment is representative of a presently preferred form of the invention, but is intended to be illustrative rather than definitive thereof. The invention is defined in the claims.

What is claimed is:

1. A harvesting assembly for harvesting agricultural crops comprising:
   a harvesting assembly frame;
   a cutter blade mounted on said harvesting assembly frame for severing crop material from plant roots;
   a crop conveyor mounted on said harvesting assembly frame and having a forward conveyor end that is to the rear of the cutter blade and above a cutting edge on the cutter blade;
   a left side lifter disk rotatably supported on said harvesting assembly frame for rotation about a left disk axis and having a lift disk periphery;
   a right side lifter disk rotatably supported on said harvesting assembly frame for rotation about a right disk axis and having a right disk periphery, and wherein the left disk periphery diverges from the right disk periphery above and forward of the left disk axis and the right disk axis to receive and gather crop material, and wherein the left disks periphery converges with the right disk periphery below and to the rear of the left disk axis and the right disk axis to pinch crop material severed from plant roots by the cutter blade, to lift the pinched crop material as the left side disk and the right side disk rotate and wherein the left disk periphery diverges from the right disk periphery above the crop material conveyor and releases crop material; and
   wherein the left side lifter disk and the right side lifter disk are both supported on said harvester frame in positions in which the left disk periphery and the right disk periphery are at a higher elevation than a lowest portion of the forward conveyor end during operation.

2. A harvesting assembly for harvesting agricultural crops, as set forth in claim 1, wherein the left disk axis and the right disk axis are both horizontal and transverse to the direction of forward movement of the harvesting assembly.

3. A harvesting assembly for harvesting agricultural crops, as set forth in claim 1, wherein the left disk and the right disk rotate about a common axis.

4. A harvesting assembly for harvesting agricultural crops, as set forth in claim 3, wherein the left disk is flexible, the right disk is flexible and the left disk periphery is urged toward the right disk periphery to pinch crop material by at least one left side slide bearing attached to the harvesting assembly frame and in sliding contact with a left disk outside surface, and at least one right side slide bearing attached to the harvesting assembly frame and in sliding contact with a right disk outside surface.

5. A harvesting assembly for harvesting agricultural crops, as set forth in claim 1, wherein the left side lifter disk and the right side lifter disk are mounted on a common transverse horizontal shaft.

6. A harvesting assembly for harvesting agricultural crops, as set forth in claim 1, wherein the left disk axis extends upwardly and forwardly from the left side lifter disk and toward the right side lifter disk; and
   wherein the right disk axis extends upwardly and forwardly from the right side lifter disk and toward the left side lifter disk.

7. A harvesting assembly for harvesting agricultural crops, as set forth in claim 6, wherein the left side lifter disk is driven by a left side hydraulic motor and the right side lifter disk is driven by a right side hydraulic motor.

8. A harvesting assembly for harvesting agricultural crops, as set forth in claim 6, wherein the left side lifter disk and the right side lifter disk are rotated by forward movement of the harvesting assembly and simultaneous engagement with crop material.

9. A harvesting assembly for harvesting agricultural crops comprising:
   a harvesting assembly frame;
   a cutter blade mounted on said harvesting assembly frame for severing crop material from plant roots;
   a crop conveyor mounted on said harvesting assembly frame and having a forward conveyor end that is to the rear of the cutter blade and above a cutting edge on the cutter blade;
   a left side lifter disk rotatably supported on said harvesting assembly frame for rotation about a left disk axis and having a left disk periphery;
   a right side lifter disk rotatably supported on said harvesting assembly frame for rotation about a right disk axis and having a right disk periphery, and wherein the left disk periphery diverges from the right disk periphery above and forward of the left disk axis and the right disk axis to receive and gather crop material, and wherein the left disk periphery converges with the right disk periphery below and to the rear of the left disk axis and the right disk axis to pinch crop material severed from plant roots by the cutter blade, to lift the pinched crop material as the left side disk and the right side disk rotate and wherein the left disk periphery diverges from the right disk periphery above the crop material conveyor and releases crop material; and
   wherein the left disk axis and the right disk axis are both horizontal and transverse to the direction of forward movement of the harvesting assembly.

10. A harvesting assembly for harvesting agricultural crops comprising:
- a harvesting assembly frame;
- a cutter blade mounted on said harvesting assembly frame for severing crop material from plant roots;
- a crop conveyor mounted on said harvesting assembly frame and having a forward conveyor end that is to the rear of the cutter blade and above a cutting edge on the cutter blade;
- a left side lifter disk rotatably supported on said harvesting assembly frame for rotation about a left disk axis and having a left disk periphery;
- a right side lifter disk rotatably supported on said harvesting assembly frame for rotation about a right disk axis and having a right disk periphery, and wherein the left disk periphery diverges from the right disk periphery above and forward of the left disk axis and the right disk axis to receive and gather crop material, and wherein the left disk periphery converges with the right disk periphery below and to the rear of the left disk axis and the right disk axis to pinch crop material severed from plant roots by the cutter blade, to lift the pinched crop material as the left side disk and the right side disk rotate and wherein the left disk periphery diverges from the right disk periphery above the crop material conveyor and releases crop material; and
- wherein the left disk and the right disk rotate about a common axis.

11. A harvesting assembly for harvesting agricultural crops, as set forth in claim 10, wherein the left disk is flexible, the right disk is flexible and the left disk periphery is urged toward the right disk periphery to pinch crop material by at least one left side slide bearing attached to the harvesting assembly frame and in sliding contact with a left disk outside surface, and at least one right side slide bearing attached to the harvesting assembly frame and in sliding contact with a right disk outside surface.

12. A harvesting assembly for harvesting agricultural crops comprising:
- a harvesting assembly frame;
- a cutter blade mounted on said harvesting assembly frame for severing crop material from plant roots;
- a crop conveyor mounted on said harvesting assembly frame and having a forward conveyor end that is to the rear of the cutter blade and above a cutting edge on the cutter blade;
- a left side lifter disk rotatably supported on said harvesting assembly frame for rotation about a left disk axis and having a left disk periphery;
- a right side lifter disk rotatably supported on said harvesting assembly frame for rotation about a right disk axis and having a right disk periphery, and wherein the left disk periphery diverges from the right disk periphery above and forward of the left disk axis and the right disk axis to receive and gather crop material, and wherein the left disk periphery converges with the right disk periphery below and to the rear of the left disk axis and the right disk axis to pinch crop material severed from plant roots by the cutter blade, to lift the pinched crop material as the left side disk and the right side disk rotate and wherein the left disk periphery diverges from the right disk periphery above the crop material conveyor and releases crop material; and
- wherein the left side lifter disk and the right side lifter disk are mounted on a common transverse horizontal shaft.

13. A harvesting assembly for harvesting agricultural crops comprising:
- a harvesting assembly frame;
- a cutter blade mounted on said harvesting assembly frame for severing crop material from plant roots;
- a crop conveyor mounted on said harvesting assembly frame and having a forward conveyor end that is to the rear of the cutter blade and above a cutting edge on the cutter blade;
- a left side lifter disk rotatably supported on said harvesting assembly frame for rotation about a left disk axis and having a left disk periphery;
- a right side lifter disk rotatably supported on said harvesting assembly frame for rotation about a right disk axis and having a right disk periphery, and wherein the left disk periphery diverges from the right disk periphery above and forward of the left disk axis and the right disk axis to receive and gather crop material, and wherein the left disk periphery converges with the right disk periphery below and to the rear of the left disk axis and the right disk axis to pinch crop material severed from plant roots by the cutter blade, to lift the pinched crop material as the left side disk and the right side disk rotate and wherein the left disk periphery diverges from the right disk periphery above the crop material conveyor and releases crop material;
- wherein the left disk axis extends upwardly and forwardly from the left side lifter disk and toward the right side lifter disk;
- wherein the right disk axis extends upwardly and forwardly from the right side lifter disk and toward the left side lifter disk; and
- wherein the left side lifter disk is driven by a left side hydraulic motor and the right side lifter disk is driven by a right side hydraulic motor.

14. A harvesting assembly for harvesting agricultural crops comprising:
- a harvesting assembly frame;
- a cutter blade mounted on said harvesting assembly frame for severing crop material from plant roots;
- a crop conveyor mounted on said harvesting assembly frame and having a forward conveyor end that is to the rear of the cutter blade and above a cutting edge on the cutter blade;
- a left side lifter disk rotatably supported on said harvesting assembly frame for rotation about a left disk axis and having a left disk periphery;
- a right side lifter disk rotatably supported on said harvesting assembly frame for rotation about a right disk axis and having a right disk periphery, and wherein the left disk periphery diverges from the right disk periphery above and forward of the left disk axis and the right disk axis to receive and gather crop material, and wherein the left disk periphery converges with the right disk periphery below and to the rear of the left disk axis and the right disk axis to pinch crop material severed from plant roots by the cutter blade, to lift the pinched crop material as the left side disk and the right side disk rotate and wherein the left disk periphery diverges from the right disk periphery above the crop material conveyor and releases crop material; and
- wherein the flexible left side lifter disk and the flexible right side lifter disk both flex to permit the passage of thick mats of crop material.

\* \* \* \* \*